United States Patent
Horii et al.

(10) Patent No.: US 7,521,894 B2
(45) Date of Patent: Apr. 21, 2009

(54) DEVICE COMBINATION SYSTEM INCLUDING PLURALITY OF DEVICES AND METHOD OF DETECTING A STATE OF A BATTERY MOUNTED ON A POWER SUPPLY DEVICE SUPPLYING POWER TO SAID PLURALITY OF DEVICES

(75) Inventors: Hirofumi Horii, Asaka (JP); Mikio Watanabe, Asaka (JP)

(73) Assignee: Fujifilm Corporation, Minato-ku, Tokyo (JP)

( * ) Notice: Subject to any disclaimer, the term of this patent is extended or adjusted under 35 U.S.C. 154(b) by 55 days.

(21) Appl. No.: 11/086,908

(22) Filed: Mar. 23, 2005

(65) Prior Publication Data
US 2005/0212490 A1  Sep. 29, 2005

(30) Foreign Application Priority Data
Mar. 29, 2004 (JP) .............................. 2004-094929

(51) Int. Cl.
  *H02J 7/00*  (2006.01)
  *G03B 17/00*  (2006.01)
(52) U.S. Cl. ................... 320/132; 320/116; 320/149; 396/277; 396/303; 396/52
(58) Field of Classification Search ............. 320/116, 320/132, 149, 106, 135; 396/277, 303, 52; 429/23; 348/207, 222.1
See application file for complete search history.

(56) References Cited

U.S. PATENT DOCUMENTS

| | | | | |
|---|---|---|---|---|
| 4,269,494 A | * | 5/1981 | Shiozawa et al. | 396/279 |
| 4,843,416 A | * | 6/1989 | Brower | 396/106 |
| 5,140,361 A | * | 8/1992 | Ishikawa et al. | 396/211 |
| 5,210,568 A | * | 5/1993 | Miyake et al. | 396/303 |
| 5,390,130 A | * | 2/1995 | Watanabe et al. | 702/63 |
| 5,499,052 A | * | 3/1996 | Nakanishi et al. | 348/220.1 |
| 5,506,620 A | * | 4/1996 | Ozawa | 348/333.02 |
| 5,701,527 A | * | 12/1997 | Sakabe et al. | 396/277 |
| 5,713,050 A | * | 1/1998 | Ozawa | 396/56 |
| 5,732,291 A | * | 3/1998 | Ohishi | 396/55 |

(Continued)

FOREIGN PATENT DOCUMENTS

JP  05-37828  2/1993

(Continued)

OTHER PUBLICATIONS

Notice of Reasons for Rejection dated Aug. 20, 2007 with an English translation.

*Primary Examiner*—M'Baye Diao
(74) *Attorney, Agent, or Firm*—McGinn IP Law Group, PLLC

(57) ABSTRACT

In a device combination system of the present invention, END setting parameters are read from a main body. A power supply converter and END setting parameters are obtained from a camera head and a battery. An END setting value is set according to these END parameters. A CPU determines whether or not the battery being mounted is in an unusable state that it is exhausted to a dead level. With the above arrangement, there is provided a device combination system in which a battery check function provided in a power supply device works normally regardless of a type of a device mounted on the power supply device.

25 Claims, 6 Drawing Sheets

U.S. PATENT DOCUMENTS

| | | | | |
|---|---|---|---|---|
| 5,732,295 | A * | 3/1998 | Seki et al. | 396/279 |
| 5,809,315 | A * | 9/1998 | Ohtsuka | 713/323 |
| 5,943,519 | A * | 8/1999 | Aoki | 396/429 |
| 6,014,012 | A * | 1/2000 | Murao et al. | 320/116 |
| 6,031,999 | A * | 2/2000 | Ogawa | 396/303 |
| 6,091,909 | A * | 7/2000 | McIntyre et al. | 396/278 |
| 6,345,152 | B1 * | 2/2002 | Sato | 396/52 |
| 6,345,157 | B1 * | 2/2002 | Watanabe | 396/279 |
| 6,487,369 | B1 * | 11/2002 | Sato | 396/52 |
| 6,580,460 | B1 * | 6/2003 | Takahashi et al. | 348/372 |
| 6,816,283 | B1 * | 11/2004 | Yamamoto et al. | 358/1.6 |
| 6,859,682 | B2 * | 2/2005 | Naka et al. | 700/245 |
| 7,092,627 | B2 * | 8/2006 | Ushiro | 396/303 |
| 7,154,553 | B2 * | 12/2006 | Horii et al. | 348/372 |
| 2002/0024332 | A1 * | 2/2002 | Gardner | 324/103 R |
| 2003/0048362 | A1 * | 3/2003 | Watanabe et al. | 348/222.1 |
| 2003/0187547 | A1 * | 10/2003 | Naka et al. | 700/245 |
| 2005/0231167 | A1 * | 10/2005 | Kubota | 320/132 |

FOREIGN PATENT DOCUMENTS

| | | |
|---|---|---|
| JP | 07-031067 | 1/1995 |
| JP | 08-098415 | 4/1996 |
| JP | 11-194157 | 7/1999 |
| JP | 2000-010151 | 1/2000 |

* cited by examiner

DEVICE COMBINATION SYSTEM INCLUDING PLURALITY OF DEVICES AND METHOD OF DETECTING A STATE OF A BATTERY MOUNTED ON A POWER SUPPLY DEVICE SUPPLYING POWER TO SAID PLURALITY OF DEVICES

BACKGROUND OF THE INVENTION

1. Field of the Invention

The present invention relates to a device combination system which includes a plurality of devices each having a circuit operated by being supplied with power and which has such a structure that a battery is mounted on at least one power supply device. A plurality of devices including the power supply device which are optionally selected from the above plurality of devices, are combined with each other and operated by being supplied with power from the power supply device.

2. Description of the Related Art

Many apparatuses operated by a battery have a battery check function. In recent years, since many types of batteries are available, some apparatus are also provided with a battery type detecting function (refer to, for example, Japanese Patent Application Laid-Open Nos. 5-37828 and 11-194157).

The technique proposed by the apparatus disclosed in Japanese Patent Application Laid-Open No. 5-37828 is such that the type of a battery is notified to a controller in the apparatus through a mode button, an operation stop voltage is set by the controller as a threshold value according to the type of the battery, and when the threshold value is exceeded, the controller issues a warning. The technique proposed by Japanese Patent Application Laid-Open No. 11-194157 is similar to the above technique except that the type of a battery is automatically detected by the voltage output from the battery in place of the mode button.

Further, some of the apparatuses having the battery check function as described above extend the operating time of apparatuses by reducing power supplied from a battery to a load when the remaining amount of power in the battery decreases (refer to Japanese Patent Application Laid-Open No. 7-31067).

In recent years, various device combination systems are arranged by detachably mounting various devices such as a display device, a printer, and the like on devices such as a digital camera and a mobile phone, and the like. Among these device combination systems, there are systems arranged such that a digital camera, a mobile phone, and the like, for example, act as a power supply device and supplies power to a device, for example, an external display device mounted on the digital camera and the mobile phone.

In general, apparatuses such as the digital camera, the mobile phone, and the like, which are operated by a battery, have the battery check function as described above, and when the digital camera or the mobile phone is operated independently, the battery check function thereof operates accurately and precisely notifies a user of timing at which the battery is to be replaced.

However, when the device combination systems as described above are arranged, there is a possibility that the battery check function built in the digital camera and the mobile phone that acts as the power supply device does not work well.

SUMMARY OF THE INVENTION

The present invention has been made in view of the above circumstances and provides a device combination system arranged such that even if any type of a device is mounted on a power supply device, a battery check function provided with the power supply device works normally.

To achieve the above object, a device combination system of the present invention which includes a plurality of devices each having a circuit operated by being supplied with power and has such a structure that a battery is mounted on at least one power supply device and a plurality of devices including the power supply device, which are optionally selected from the above plurality of devices, are combined with each other and operated by being supplied with power from the power supply device, wherein the power supply device includes:

a setting section to set an END setting value, which determines whether or not the battery mounted on the power supply device is in an unusable state that it is exhausted to a dead level, the END setting value being set to a value according to the combination of the plurality of devices, and a detecting section to detect the unusable state of the battery using the END setting value set by the setting section as a criterion of determination.

According to the device combination system of the present invention, the END setting value is set according to the combination of the plurality of devices by the setting section included in the power supply device. Then, the detecting section determines whether or not the battery mounted on the power supply device is in the unusable state that the battery is exhausted to the dead level using the END setting value as the criterion of determination.

Thus, even if any type of the device combination system is arranged by mounting a plurality of devices on the power supply device, an END setting value according to the combination of the plurality of devices is set by the setting section of the power supply device. Accordingly, whether or not the battery mounted on the power supply device is in the unusable state that it is exhausted to the dead level can be accurately detected by the detecting section of the power supply device.

When, for example, the power supply device is a digital camera and the device combination system is arranged by combining a device acting as an external display device with the digital camera, there is realized a device combination system in which a battery check function, which is composed of the setting section and the detecting section disposed to the digital camera, accurately works, thereby the unusable state of a battery mounted on the digital camera can be accurately detected even if the external display device is combined with the digital camera.

It is preferable that the plurality of devices have parameters relating to their respective power consumption, the combined devices transmit their respective parameters to the power supply device, and the setting section sets the END setting value based on the parameters received from the combined devices When the power supply device receives the parameters relating to the power consumption of the devices combined therewith from the devices and sets the END setting value, even if the devices are combined with the power supply device in any manner, the power supply device receives the parameters relating to the power consumption of the combined devices therefrom, and an END setting value according to the combination of the devices is set by the setting section of the power supply device.

Even if any type of a combination device is combined with the power supply device, it can be accurately detected by the detecting section of the power supply device that the battery being mounted is in the unusable state.

The setting section may set the END setting value to the detecting section as a criterion of determination of the unusable state as described above. However, there may be provided a device combination system which includes a plurality of devices each having a circuit operated by being supplied with power and has such a structure that a battery is mounted on at least one power supply device and a plurality of devices including the power supply device, which are optionally selected from the above plurality of devices, are combined with each other and operated by being supplied with power from the power supply device, wherein the power supply device includes a setting section to set a determination algorithm, which determines whether or not the battery mounted on the power supply device is in the unusable state that it is exhausted to the dead level, the determination algorithm being set according to the combination of the plurality of devices, and a detecting section to detect the unusable state of the battery according to the determination algorithm set by the setting section.

When the setting section of the power supply device sets the determination algorithm according to the combination of the plurality of devices, even if any type of a device is combined, whether or not the battery mounted on the power supply device is in the unusable state is detected according to the determination algorithm in accordance with the combination.

It is preferable that the setting section sets the determination algorithm as well as sets timing of determination at which the unusable state of the battery is determined according to the combination of the plurality of devices, and that the detecting section detects the unusable state of the battery at the timing of determination set by the setting section according to the determination algorithm set by the setting section.

Accordingly, the unusable state is detected according to the determination algorithm at the timing of determination at which the unusable state can be most accurately detected according to the combination of the plurality of devices, that is, according to the load applied to the battery by the combination of the plurality of devices. In case of, for example, a camera, when a camera head is mounted on a camera main body as a combination device, timing of release is set as the timing of determination, and determination is executed according to a predetermined algorithm at the timing of release. With this arrangement, the unusable state is detected factoring in power necessary to release processing.

Further, it is preferable that the plurality of devices have parameters relating to their respective power consumption, the combined devices transmit their respective parameters to the power supply device, and the setting section sets the determination algorithm based on the parameters received from the combined devices.

Accordingly, the setting section receives the parameters relating to the power consumption transmitted from each of the plurality of combined devices, sets the determination algorithm based on the parameters, and the detecting section of the power supply device accurately detects whether or not the battery being mounted is in the unusable state according to the algorithm factoring in the parameters.

DETAILED DESCRIPTION OF THE INVENTION

An embodiment of the present invention will be explained below.

Figure 1:
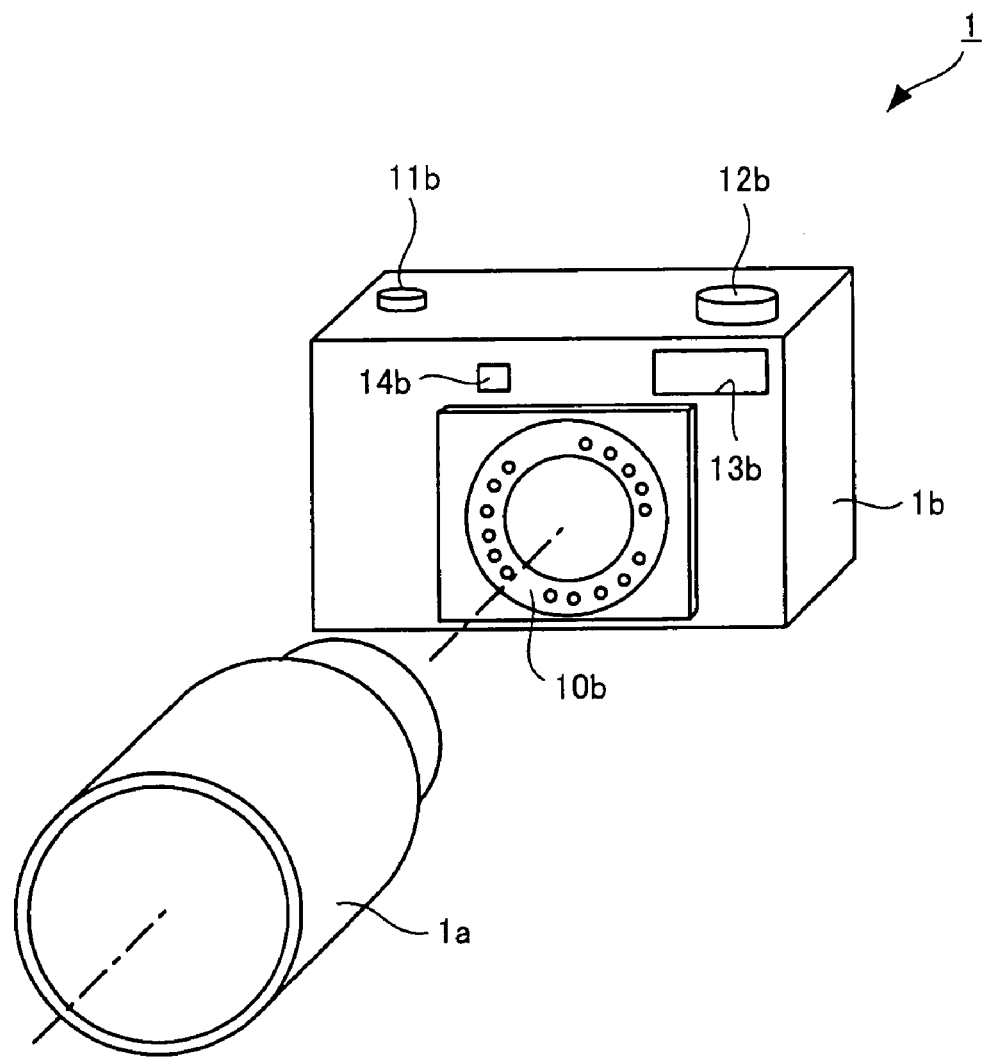
FIG. 1 is a perspective view showing an example of a device combination system as an embodiment of the present invention.

FIG. 1 is a perspective view showing an example of a device combination system as the embodiment of the present invention.

FIG. 1 shows a camera main body $1b$ acting as a power supply device according to the present invention and a camera head $1a$ as an example of a combination device according to the present invention. The device combination system is arranged by detachably mounting a display device, a printer, and the like on the camera main body $1b$ as other combination devices.

As shown in FIG. 1, since the outside appearance of the camera head $1a$ is the same as a conventional interchangeable lens, the camera main body $1b$ will be mainly explained.

A head mount section $10b$ having many mount contacts is disposed at a center of the camera main body $1b$. A similar mount section is also disposed on the camera head $1a$. When the camera head $1a$ is mounted on the camera main body $1b$ along a chain line shown in the figure such that the mount contacts of the head mount section $10b$ are aligned with those of the mount contacts section of the camera head $1a$, the camera head $1a$ is electrically connected to the camera main body $1b$.

The many mount contacts are allocated for the purposes of communication and power supply so that communication is executed from the camera main body $1b$ to the camera head $1a$ and from the camera head $1a$ to the camera main body $1b$, and further power is supplied from the camera main body $1b$ to the camera head $1a$.

Further, a release button $11b$ and a mode dial $12b$ are disposed on the upper surface of the camera main body $1b$, and the mode dial $12b$ switches between an image pick-up mode and a reproduction mode. When the image-pick-up mode is selected by the mode dial $12b$ and the release button $11b$ is manipulated, an image is picked up in response to the manipulation of the release button $11b$ that acts as a sign to start of an image pick-up operation. Note that FIG. 1 shows one of a plurality of camera heads and one of a plurality of main bodies, respectively as an example. Further, the camera main body $1b$ is also provided with a flash emission window $13b$ and a sensor $14b$. The flash emission window $13b$ is used, when luminance of a field is dark, to apply a flash emitted from an electronic flash gun from the camera main body $1b$ to the outside of it, and the sensor 14b is used to detect a type of a light source which is information necessary to adjust white balance.

An internal arrangement of the camera main body 1b acting as the power supply device will be explained.

Figure 2:
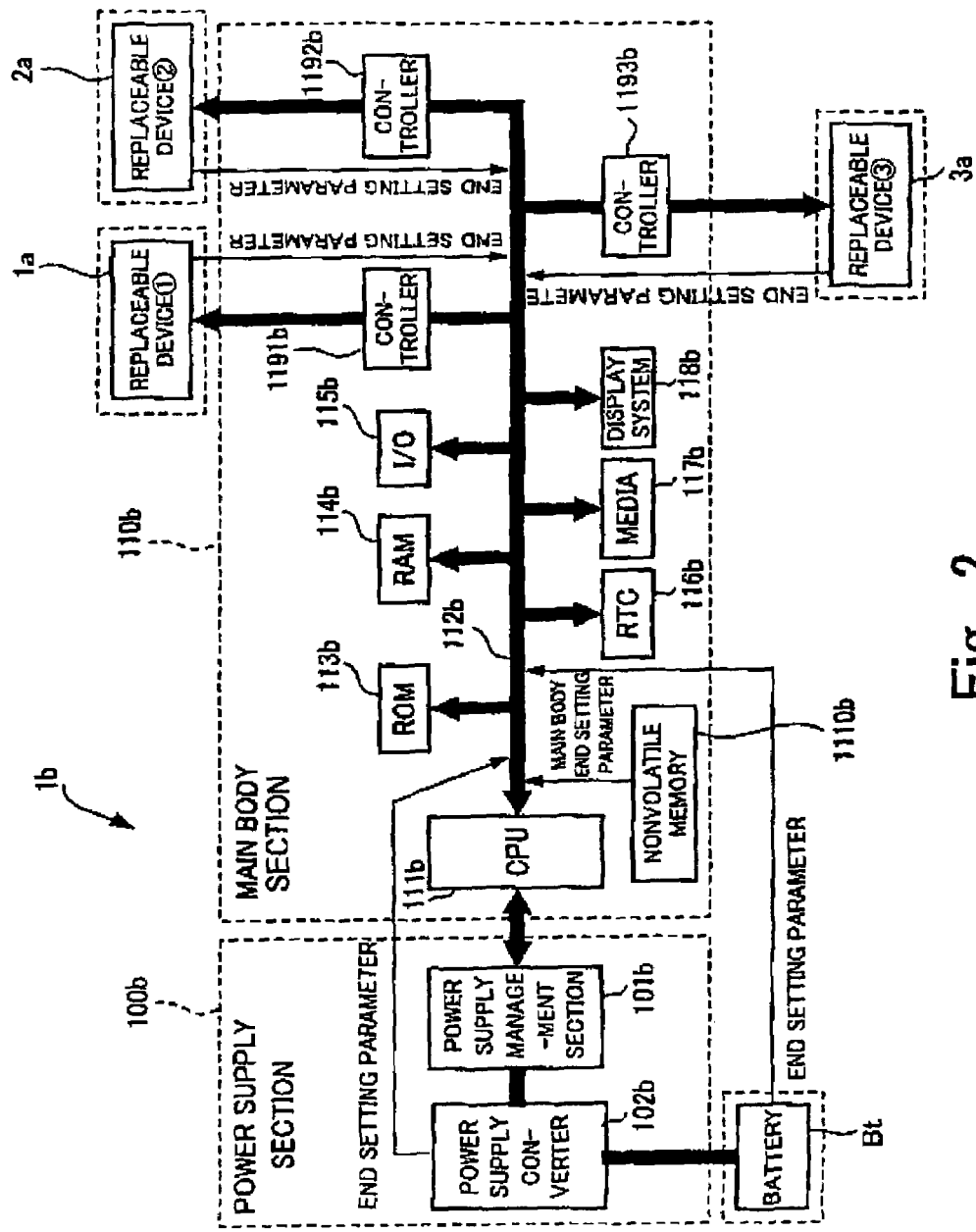
FIG. 2 is a block diagram showing an internal arrangement of a camera main body $1b$, which is particularly necessary to control a power supply system.

FIG. 2 is a block diagram showing the internal arrangement of a camera main body which is particularly necessary to control a power supply system.

FIG. 2 shows that three replaceable devices, that is, devices 1a, 2a, 3a can be detachably mounted on the camera main body 1b at maximum as combination devices that can be optionally combined with the camera main body 1b. However, it is supposed in the following explanation that the camera head 1a shown in FIG. 1 is mounted on the camera main body 1b as the replaceable device.

The camera main body 1b shown in FIG. 2 is composed of a power supply section 100b and a main body section 110b. The power supply section. 100b is composed of a battery Bt, a power supply converter 102b which receives power from the battery Bt and supplies the power received therefrom to respective sections in the camera main body, and a power supply management section 101b which manages a voltage output from the battery Bt when it is in use. The main body section 110b includes a CPU 111b which receives END setting parameters from the power supply section 100b, the battery Bt, and a replaceable device, that is, the camera head here and sets an END setting value based on the END setting parameters as well as determines an unusable state of the battery Bt based on the END setting value. The camera main body 1b has such a structure that the battery Bt is mounted thereon. Since the battery Bt is replaceably mounted thereon, it is shown in FIG. 2 that each time the battery Bt is mounted, the END setting parameters of the battery Bt are transmitted to the camera main body 1b. When, for example, a wireless tag on which the END setting parameters are written is affixed to a battery pack, the END setting parameters are transmitted from the wireless tag.

Further, when the camera head 1a is coupled with the camera main body 1b and power is supplied from the camera main body 1b to the camera head 1a through a controller 1191b, END setting parameters necessary for processing is written to, for example, a RAM 114b through the controller 1191b and a bus 112b under the control of the CPU 111b. Further, END setting parameters are also written from a power supply converter 102b to the RAM 114b through the bus 112b under the control of the CPU 111b. Furthermore, main body setting END parameters are read from an non-volatile memory 1110b, in which they are stored in a non-volatile fashion, and written to the RAM 114b under the control of the CPU 111b.

The CPU 111b of the main body section 110b executes various processings according to the procedural steps of a program stored in a ROM 113b. At the time, the CPU 111b reads or rewrites the contents of the program in the RAM 114b, the contents of an I/O section 115b, and the contents of a register and the like of the controller 1191b. After the END setting parameters are read from the respective sections by the CPU 111b and written to the RAM 114b as shown in FIG. 2, the END setting value is set based on the parameters in the RAM 114b.

The CPU 111b integrally controls the camera system shown in FIG. 1. For example, when the camera head 1a is mounted on the camera main body 1b, it is possible to cause the controller 1191b to receive a through image signal created by the camera head 1a in response to, for example, switching from the mode dial to the image pick-up mode and to supply the through image signal received by the controller 1191b to a display system 118b through the bus 112b. Further, the CPU 111b can also cause the controller 1191b to receive a still image signal created by the camera head in response to the manipulation of the release button and can supply the still image signal received by the controller to a medium 117b through the bus. When, for example, an external display device is mounted as the second replaceable device 2a, the CPU 111b can also transfer the through image signal received by the controller 1191b to the external display device through the bus 112b and the controller 1192b. Further, when image signals such as the through image signal and the like are supplied to the display system or to the external display device, it is also possible to supply time information from an RTC (real time clock) 116b together with the image signals.

As described above, the operation of the camera system shown in FIG. 1 is integrally controlled by the CPU 111b, and a battery check function is included in the items that are controlled by the CPU 111b.

Figure 3:
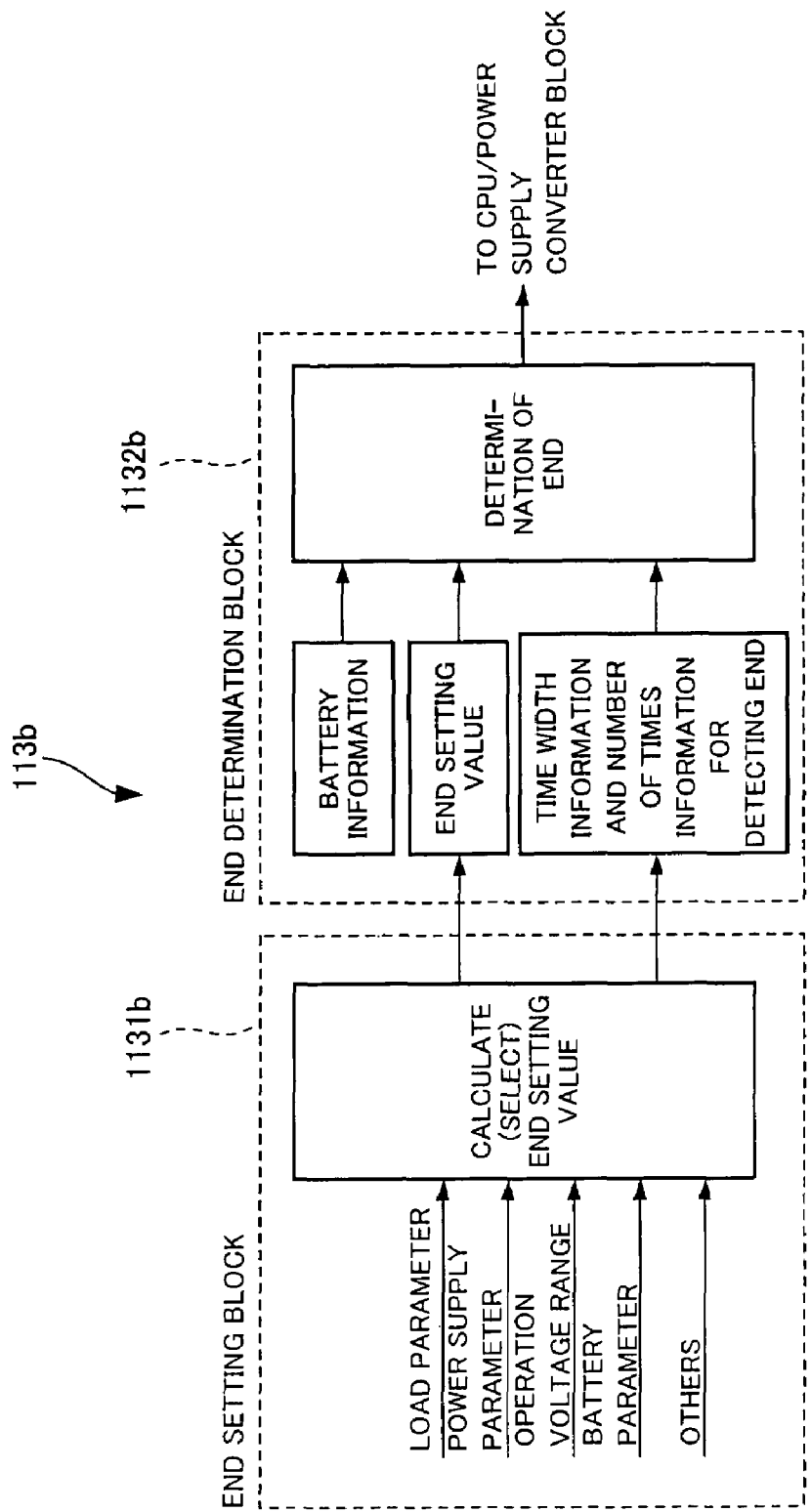
FIG. 3 is a view showing an arrangement of a battery management program in a ROM $113b$.

FIG. 3 is a view showing an arrangement of a battery check program for realizing the battery check function. The program is stored in the ROM 113b, and the CPU 111b checks the battery Bt mounted in a battery mounting chamber of the main body section 110b according to the procedural steps of the program.

The battery check program shown in FIG. 3 is composed of an END setting block 1131b corresponding to a setting section according to the present invention and an END determination block 1132b corresponding to a detecting section according to the present invention.

When the respective END setting parameters and the main body END setting parameters shown in FIG. 2 are written to the RAM 114b as parameters relating to power consumption based on the processing procedures of the END setting block 1131b shown in FIG. 3, the END setting block 1131b sets the END setting value to the END determination block 1132b based on the parameters. The END setting value, battery information supplied from a power supply management section 101b of the power supply section 100b, and further information such as time width and number of times of use for detecting END, which are included in the parameters relating to the power consumption of the power supply converter, the camera head, and the like, are supplied to the END determination block 1132b, which determines whether or not the battery Bt being loaded is in an unusable state because it is consumed to a dead level.

How the END setting value is set in the camera system shown in FIG. 1 will be specifically explained with reference to FIG. 4.

Figure 4:
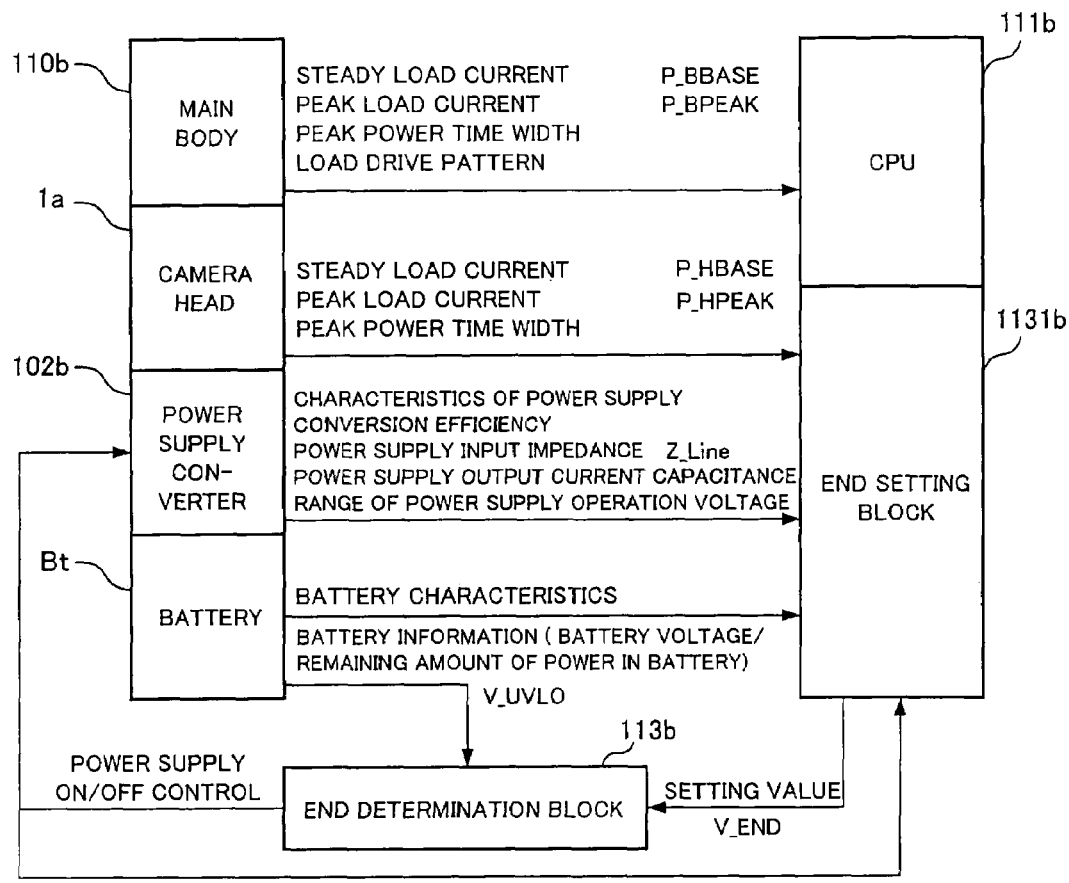
FIG. 4 is a view summarizing how necessary information is transmitted when a camera head shown in FIG. 1 is mounted on a camera main body as a device.

FIG. 4 is a view explaining how the END setting value is set based on the parameters relating to the power consumption when the camera head 1a shown in FIG. 1 is mounted on the camera main body 1b as a combination device.

FIG. 4 shows the parameters relating to the power consumption of the main body section 110b, the camera head 1a, the power supply converter 102b, and the battery Bt, respectively. The END setting value is set in the END determination block 1132b according to the processing procedures of the END setting block 1131b (refer to FIG. 3) in the ROM 113b based on these parameters with reference to, for example, a table, and the like.

A steady load current P_BBASE and a peak load current P_BPEAK of the main body section 110b are shown in a first row of FIG. 4 as parameters necessary to set the END setting value, and further parameters such as a peak power time width and a load drive pattern are also shown in the first row, in addition to the above parameters. The parameters such as the peak power time width and the load drive pattern correspond to the time width information and the number of times of use information for detecting END shown in FIG. 3.

A steady load current P_HBASE and a peak load current P_HPEAK are shown in a second row of FIG. 4 as parameters which are transmitted from the camera head 1a and relate to power consumption necessary to calculate the END setting value, and the peak power time width and the like are also shown in the second row, in addition to the above parameters. The peak power time width also corresponds to the time width information and the number of times of use information for detecting END shown in FIG. 3.

A power conversion efficiency characteristic, a power input impedance Zline, a power supply output current capacitance, and a power supply operating voltage range are shown in a third row of FIG. 4 as parameters relating to power consumption necessary to calculate the END setting value, and battery characteristics, for example, a battery cycle characteristic, and the like are shown in a fourth row of FIG. 4. The END setting value is set in the END determination block based on these parameters. When, for example, the table is disposed in the END determination block, the END setting value V_END is referred to based on these parameters and the referred END setting value V_END is set in the END determination block 1132b.

When the voltage output from the battery and detected by the power supply converter is smaller than the END setting value V_END set by the END setting block, it is determined that the battery is in the unusable state because it is consumed to the dead level.

As described above, first, the CPU 111b obtains the respective parameters according to the procedural steps of the END setting block and writes them to, for example, the RAM 114b, subsequently the CPU 111b sets the END setting value in the END determination block according to the procedural steps of the END determination section with reference to the table. Next, the CPU 111b compares the voltage output from the battery with the END setting value V_END of the battery according to the procedural steps of the END determination section using the END determination value as a criterion. When it is determined that the voltage output from the battery is smaller than the END setting value V_END as a result of comparison, the CPU 111b determines that the battery is consumed to the dead level and indicates the power supply converter 102b to interrupt the supply of power. Note that this determination is made in consideration of the time width information and the number of times of use information for detecting END.

When the END setting value is set in, for example, an internal register of the CPU of the camera main body 1b based on the parameters relating to the power consumption of the camera head 1a, no malfunction occurs in the battery check function of the camera main body 1b even if the camera head 1a is mounted on the camera main body 1b. Accordingly, the state of power consumption in the battery can be accurately detected, thereby there is realized a device combination system in which a warning is issued for the first time when the CPU determines that the battery is consumed to the dead level.

Processing executed by the CPU 111b according to the procedural steps of the battery check program in the ROM will be briefly explained.

Figure 5:
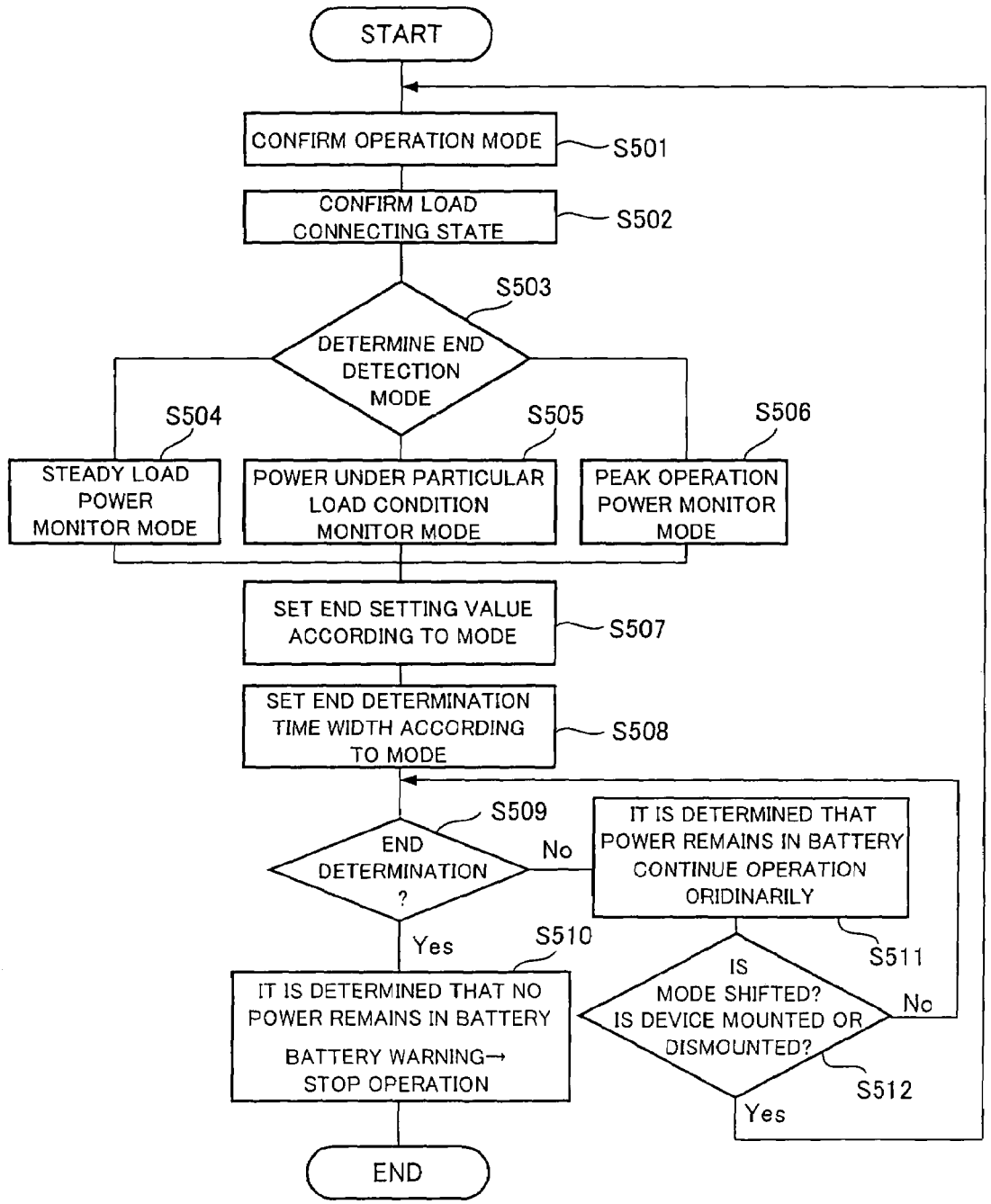
FIG. 5 is a flowchart showing procedural steps executed by a CPU.

FIG. 5 is a flowchart showing the procedural steps of the END determination block in the battery check program stored in the ROM.

When, for example, the camera head 1a is mounted on the camera main body 1b, a power supply switch mounted on the camera main body 1b is turned on, the CPU 111b starts the processing, and the respective parameters shown in FIG. 3 are obtained according to the procedural steps of the END setting block 1131b shown in FIG. 3, the processing of the flow is started.

An operation mode is confirmed at step S501. In the camera system shown in, for example, FIG. 1, the operation mode is a reproduction mode, the image pick-up mode, and the like. Next, whether devices, which act as the loads on the battery, are connected is confirmed. Since the parameters are obtained by the END setting block, whether the camera head 1a is connected and whether the external display device and the like are connected in addition to the camera head 1a are confirmed by checking the parameters, the voltage of connectors, and the like.

At next step S503, it is determined what type of a detection mode is employed.

At step S503, the detection mode is determined as follows. For example, when the camera head 1a is mounted and the mode dial 12b of the camera system shown in FIG. 1 is switched to the image pick-up mode, it is determined that the camera should be operated by a steady load voltage and the process goes to a steady load power monitor mode of step S504. When the external display device is further mounted in the above state, the detection mode is such that it should be operated under, for example, a particular load condition, and the process goes to a power under particular load condition monitor mode of step S505. Further, when the release button is manipulated and a still image is picked up, the detection mode is such that it should be operated by peak operation power, and the process goes to a peak operation power monitor mode of step S506.

At next step S507, END setting value V_END according to each of the above modes is set by selecting it from plural END setting values set according to the procedural steps of the program of, for example, the END setting block. Further, at step S508, an END determination time width is set according to each mode. At next step S509, END is determined based on the END setting value V_END set at step S507 and the time width set at step S508, that is, the continuously operating time of the device. Note that the END determination time width at step S508 is obtained from the time width information included in the time width information and the number of times of use information for detecting END shown in FIG. 3.

When it is determined at step S509 that the voltage output from the battery Bt is smaller than the END setting value V_END, the process is branched to Yes, and it is determined at step S510 that the battery is exhausted, thereby a warning is issued, and the operation is stopped. When it is determined at step S509 that the voltage output from the battery Bt is not smaller than the END setting value V_END the process is branched to No, and it is determined at step S511 that power still remains in the battery, and the operation is continued. Then, the process goes to step S512 at which whether a mode is shifted or whether a device is mounted or dismounted is determined. When it is determined that a mode is shifted or a device is mounted or dismounted, the process is branched to Yes and returns to step S501 from which the process repeats the series of processings. When it is determined at step S512 that a mode is not shifted or a device is neither mounted nor dismounted, the process is branched to No and returns to step S509 at which it continues the determination of END under the same condition.

As described above, the parameters relating to the power consumption are transmitted from the camera head 1a acting as the combination device and the battery Bt is appropriately checked by the CPU 111b of the camera main body 1b as the power supply device according to the procedural steps of the battery check program in the ROM 113b when the camera head 1a is coupled with the camera main body 1b. Accordingly, the battery check function in the camera main body 1b is free from a malfunction which is observed in a conventional battery check function, thereby ensuring accurate work of the battery check function in the camera main body 1b.

When it is taken into consideration that the parameters shown in FIG. 4 are supplied to a RAM 114b as information, it is also possible for the CPU 111b to preferably determine END by setting an algorithm for determination in the END determination section 1132b according to the battery Bt being used actually in place of setting the END setting value by the table based on these parameters.

Figure 6:
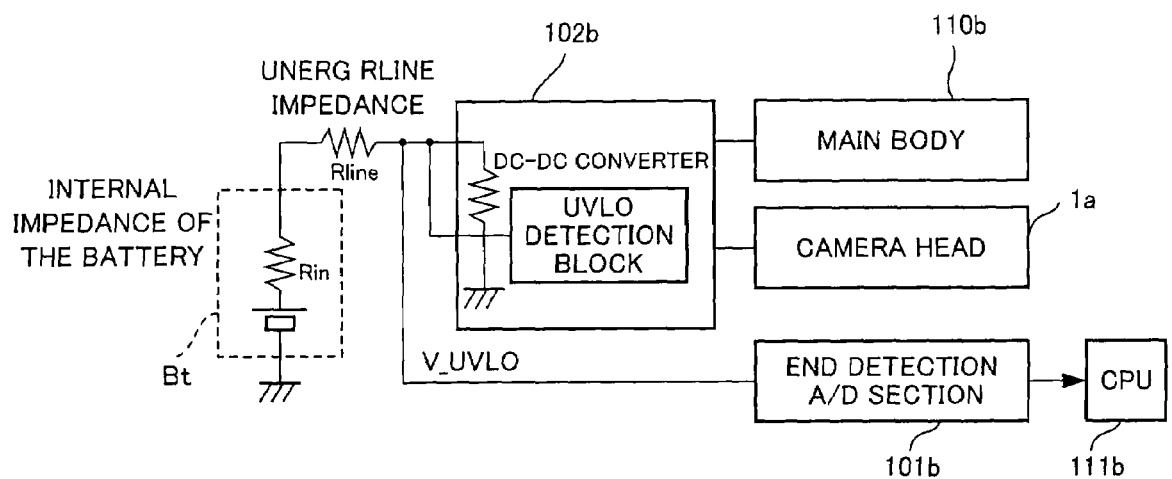
FIG. 6 is a view explaining an algorithm for determination.

FIG. 6 is a view explaining an example of the algorithm for determination.

A power system including the battery will be explained with reference to FIG. 6 prior to the explanation of the algorithm.

As shown in FIG. 6, power is supplied from the battery Bt to the main body section 110b and the camera head 1a through a DC/DC converter 102b acting as the power supply converter. The DC/DC converter 102b includes a detection block that detects the voltage input thereto. When the voltage output from the battery drops and becomes smaller than a predetermined voltage, the output from the DC/DC converter 102b is turned off, thereby no power is output. Thus, an END detection A/D section 101b acting as the power supply management section detects the voltage V_UVLO input to the DC/DC converter, and the detected voltage V_UVLO is supplied to the CPU 111b so that the CPU 111b determines whether or not the battery is in the unusable state based on the voltage V_UVLO. The determination algorithm necessary to the above determination is set in the END determination block, and the determination is executed based on the determination algorithm.

The determination algorithm will be explained here using a numerical expression.

Symbols used in the numerical expression will be explained prior to the explanation of the numerical expression.

As described above, the symbol V_ULVO shows the input voltage V_ULVO of the DC/DC converter 102b, and V_ULVO is detected by the END detection A/D section 101b and input to the CPU 111b. Further, the steady consumption power P_BBASE and the peak consumption power P_BPEAK of the camera main body 1b and the steady consumption power P_HBASE and the peak consumption power P_HPEAK of the camera head 1a are supplied to the RAM 114b, respectively so that the CPU 111b can read them. Here, the steady power consumed by the camera main body 1b and the camera head 1a is determined by Expression 1 based on the parameters in the RAM 114b.

$$P\_ALLBASE = P\_BBASE + P\_HBASE \quad \text{(Expression 1)}$$

The peak power consumed by the camera main body 1b and the camera head 1a is determined by Expression 2.

$$P\_ALLPEAK = P\_BPEAK + P\_HPEAK \quad \text{(Expression 2)}$$

Further, the relation between the END setting value and the detected voltage V_ULVO is represented by Expression 3 when the END setting value is set to V_END, an END setting margin voltage is set to V_margin, and the condition that the voltage V_UVLO detected in the END detection A/D section is not smaller than (V_END−V_MARGIN) is used as a criterion.

$$V\_UVLO = V\_END - V\_MARGIN - (P\_ALLPEAK - P\_ALLBASE)/V\_END \times Z\_LINE \quad \text{(Expression 3)}$$

Here, Zline is a parameter relating to the power consumption obtained from the battery and the power supply converter, and the parameter Zline is a value obtained by adding the internal impedance Rin and the wiring impedance Rline of the battery. More specifically, Expression 3 is derived from the parameters relating to the power consumption of the camera head 1a and the parameters relating to the power consumption of the main body 10b. When Expression 3 is established, it is detected that the voltage output from the battery drops, and the voltage input to the DC/DC converter drops to a voltage necessary to barely guarantee the operation of the DC/DC converter. That is, when the camera head 1a is mounted with Expressions 1 to 3 described in the END block from the beginning, a determination algorithm for the camera head is set in the END determination block by setting the parameters relating to the power consumption of the camera head 1a to Expressions 1 to 3, respectively. These parameters can be simply set using arguments.

Note that, since the case that the camera head 1a is mounted is exemplified here, it is possible to set timing of release as timing of determination and to cause the CPU to detect that the battery is in the unusable state according to the algorithm of Expressions 1 to 3. The timing of determination can be set according to combined devices.

When the CPU detects that the battery is in the unusable state at the timing of determination, it issues a warning that it is impossible to pick up an image as well as turns off the power supply converter so that the power supplied from the battery Bt can be shut off before the DC/DC converter 102b becomes unoperable due to the drop of power of the battery Bt.

When the determination algorithm and the timing of determination are set for each type of devices, the battery check function can be operated according to a combined devices.

Note that, although the above algorithm shows the procedural steps for detecting the voltage, there is a case that it is preferable to detect a current in place of the voltage depending on a type of the battery. In this case, a determination algorithm may be provided in the detecting section, the determination algorithm being arranged such that a current is cumulated as time passes and a battery unusable state is determined based on the total value of the cumulated current. Further, since the camera system is exemplified in the embodiment, the timing of release is exemplified as the timing of determination. When, however, an external electronic flash gun, for example, is mounted, timing at which a main capacitor begins to be charged may be used as the timing of determination. That is, by setting a timing to the time when a power-consuming event occurs, it is possible to accurately detect, based on the determination timing and the determination algorithm, unusable state of the battery in a device combination system, in which the camera head, the electronic flash gun, and the camera main body 1b are combined.

As described above, when the battery unusable state is detected by a determination algorithm obtained according to what types of devices such as the camera head, the external electronic flash, and the like are combined with the camera main body, at the timing of determination when a largest load is likely applied to the battery, the power of the battery can be effectively utilized and it can prevent unnecessary replacement of the battery while power still remains in the battery.

What is claimed is:

1. A device combination system, comprising:
   a plurality of devices each including a circuit operated by being supplied with power,
   wherein said system comprises such a structure that a battery is mounted on at least one power supply device and a plurality of devices including the power supply device, which are optionally selected from the plurality of devices, are combined with each other and operated by being supplied with power from the power supply device, wherein the power supply device comprises:
a setting section to set an END setting value, which determines whether the battery mounted on the power supply device is in an unusable state that it is exhausted to a dead level, the END setting value being set according to parameters received in said setting section and transmitted from the combination of the plurality of devices;
a detecting section to detect the unusable state of the battery using the END setting value set by the setting section as a criterion of determination; and
a memory device which stores said parameters which are transmitted from said plurality of devices,
wherein said setting section comprises a central processing unit (CPU) which is connected to said memory device via a bus, the respective parameters of said plurality of devices being written to the memory device via said bus under control of said CPU.

2. A device combination system according to claim 1, wherein the parameters transmitted from said plurality of devices include parameters relating to a respective power consumption for said plurality of devices.

3. A device combination system comprising:
a plurality of devices each including a circuit operated by being supplied with power,
wherein said system comprises such a structure that a battery is mounted on at least one power supply device and a plurality of devices including the power supply device, which are optionally selected from the plurality of devices, are combined with each other and operated by being supplied with power from the power supply device, and
wherein the power supply device comprises:
a setting section to set a determination algorithm, which determines whether the battery mounted on the power supply device is in an unusable state that it is exhausted to a dead level, the determination algorithm being set according to parameters received in said setting section and transmitted from the combination of the plurality of devices;
a detecting section to detect the unusable state of the battery according to the determination algorithm set by the setting section; and
a memory device which stores said parameters which are transmitted from said plurality of devices,
wherein said setting section comprises a central processing unit (CPU) which is connected to said memory device via a bus, the respective parameters of said plurality of devices being written to the memory device via said bus under control of said CPU.

4. A device combination system according to claim 3, wherein the setting section sets the determination algorithm and sets timing of determination at which the unusable state of the battery is determined according to the combination of the plurality of devices, and
wherein the detecting section detects the unusable state of the battery at the timing of determination set by the setting section according to the determination algorithm set by the setting section.

5. A device combination system according to claim 3, wherein the plurality of devices have parameters relating to their respective power consumption, the combined devices transmit their respective parameters to the power supply device.

6. A device combination system according to claim 1, wherein the plurality of devices comprises:
a plurality of detachable devices.

7. A device combination system according to claim 1, wherein the plurality of devices comprises:
a plurality of physically detachable devices which are independently operable separate from one another.

8. A device combination system according to claim 1, wherein the plurality of devices comprises:
a plurality of replaceable and detachable devices.

9. A device combination system according to claim 1, wherein the plurality of devices comprises:
at least one detachably mounted device.

10. A device combination system according to claim 1, wherein the power supply device comprises:
at least one mount contact for detachably mounting and electrically connecting at least one of said plurality of devices to said power supply device.

11. A device combination system according to claim 3, wherein the plurality of devices comprises:
a plurality of detachable devices.

12. A device combination system according to claim 3, wherein the plurality of devices comprises:
a plurality of physically detachable devices which are independently operable separate from one another.

13. A device combination system according to claim 3, wherein the plurality of devices comprises:
a plurality of replaceable and detachable devices.

14. A device combination system according to claim 3, wherein the plurality of devices comprises:
at least one detachably mounted device.

15. A device combination system according to claim 3, wherein the power supply device comprises:
at least one mount contact for detachably mounting and electrically connecting at least one of said plurality of devices to said power supply device.

16. A device combination system comprising:
a plurality of replaceable and detachable devices, wherein at least one of said plurality of replaceable and detachable devices includes at least one power supply device, and wherein the plurality of replaceable and detachable devices are combined with each other and operated by being supplied with power from the power supply device,
wherein the power supply device comprises:
a setting section that sets an END setting value,
wherein the setting section determines whether a battery mounted on the power supply device is in an unusable state that it is exhausted to a dead level,
wherein the setting section receives parameters transmitted from said combination of plurality of devices and based on said parameters determines a power consumption parameter of each of the combination of the plurality of replaceable and detachable devices, and
wherein the setting section sets the END setting value based on at least the determined power consumption parameter of each of the combination of the plurality of replaceable and detachable devices,
a detecting section that detects the unusable state of the battery using the END setting value set by the setting section as a criterion of determination; and a memory device which stores said parameters which are transmitted from said plurality of replaceable and detachable devices, wherein said setting section comprises a central processing unit (CPU) which is connected to said memory device via a bus, the respective parameters of said plurality of replaceable and detachable devices being written to the memory device via said bus under control of said CPU.

17. A device combination system according to claim 16, wherein the power supply device further comprises:

at least one mount contact for replaceably and detachably mounting and electrically connecting at least one of said plurality of replaceable and detachable devices to said power supply device.

18. A device combination system according to claim 17, wherein the setting section detects which of said plurality of replaceable and detachable devices are mounted and electrically connected to said at least one mount contact.

19. A method of determining whether a battery which is mounted on a power supply device of a device combination system is in an unusable state that it is exhausted to a dead level, wherein the device combination system comprises a plurality of replaceable and detachable devices, wherein at least one of said plurality of replaceable and detachable devices includes at least one power supply device, and wherein the plurality of replaceable end detachable devices are combined with each other and operated by being supplied with power from the power supply device, the method comprising:

detecting at least one of said plurality of replaceable and detachable devices being mounted and electrically connected to at least one mount contact of said power supply device;

determining a power consumption parameter of each of the at least one of said plurality of replaceable and detachable devices that is detected based on parameters transmitted from said combined plurality of devices;

setting an END setting value based on at least the determined power consumption parameter of each of the at least one of said plurality of replaceable and detachable devices; and determining whether the battery mounted on the power supply device is in an unusable state that it is exhausted to a dead level using the END setting as a criterion of determination, wherein said power supply device comprises:

a setting section for setting said END setting value:

a memory device which is connected to said CPU via a bus and stores said parameters which are transmitted from said plurality of replaceable and detachable devices, and wherein said setting section comprises a central processing unit (CPU) which is connected to said memory device via a bus, the respective parameters of said plurality of replaceable and detachable devices being written to the memory device via said bus under control of said CPU.

20. A device combination system according to claim 1, wherein said power supply device comprises a main body and said plurality of devices includes another device which is mounted on said main body.

21. A device combination system according to claim 20, wherein said main body comprises a memory device storing a battery check program comprising an END setting block corresponding to said setting section and an END determination block corresponding to said detecting section.

22. A device combination system according to claim 21, wherein said power supply device further comprises a power supply section which includes a power supply converter for supplying power from said battery to said main body, and a power supply management section which detects a voltage input to said power supply converter.

23. A device combination system according to claim 22, wherein said main body comprises said central processing unit (CPU), said CPU determining whether said battery is in the unusable state based on said input voltage detected by said power supply management section.

24. A device combination system according to claim 1, wherein said parameters transmitted to said power supply device comprise parameters respectively relating to a power consumption of said plurality of devices.

25. A device combination system according to claim 1, wherein said power supply device comprises one of a camera and a mobile phone.

* * * * *